(12) United States Patent
Lienkamp et al.

(10) Patent No.: US 8,263,279 B2
(45) Date of Patent: Sep. 11, 2012

(54) APPARATUS FOR OPTIMIZED COOLING OF A DRIVE UNIT AND A FUEL CELL IN A FUEL CELL VEHICLE

(75) Inventors: Sebastian Lienkamp, Budenheim (DE); Marc Becker, Idstein (DE)

(73) Assignee: GM Global Technology Operations LLC, Detroit, MI (US)

( * ) Notice: Subject to any disclaimer, the term of this patent is extended or adjusted under 35 U.S.C. 154(b) by 823 days.

(21) Appl. No.: 12/034,169

(22) Filed: Feb. 20, 2008

(65) Prior Publication Data
US 2009/0208782 A1    Aug. 20, 2009

(51) Int. Cl.
*H01M 8/04* (2006.01)
(52) U.S. Cl. ........................ 429/435; 429/438
(58) Field of Classification Search .................. 429/435, 429/438; 903/908, 944
See application file for complete search history.

(56) References Cited

U.S. PATENT DOCUMENTS

2004/0253499 A1* 12/2004 Sato et al. ........................ 429/32
2005/0175875 A1*  8/2005 Nelson et al. .................... 429/26
2005/0244691 A1* 11/2005 Varenne .......................... 429/26

* cited by examiner

*Primary Examiner* — Eugenia Wang
(74) *Attorney, Agent, or Firm* — Fraser Clemens Martin & Miller LLC; J. Douglas Miller

(57) ABSTRACT

A system for cooling a fuel cell stack and a drive unit in a fuel cell vehicle is disclosed, wherein the system includes a drive unit and a fuel cell stack. An oil cooling loop for the drive unit includes a three way valve, a liquid to liquid heat exchanger, and a pump. The liquid to liquid heat exchanger may be used to transfer drive unit off heat into the stack coolant loop. By not using an oil to air heat exchanger overall heat exchanger arrangement air side pressure drop can be minimized and airflow increased. The three way valve allows decoupling of the cooling loops if needed to inhibit negative impact on the fuel cell stack.

17 Claims, 1 Drawing Sheet

APPARATUS FOR OPTIMIZED COOLING OF A DRIVE UNIT AND A FUEL CELL IN A FUEL CELL VEHICLE

FIELD OF THE INVENTION

The present invention relates to a fuel cell system and, more particularly, to an apparatus and method for optimized cooling of a drive unit and a fuel cell in a fuel cell vehicle.

BACKGROUND OF THE INVENTION

A fuel cell has been proposed as a clean, efficient, and environmentally responsible energy source for electric vehicles and various other applications. In particular, the fuel cell has been identified as a potential alternative for the traditional internal-combustion engine used in modern vehicles. One type of fuel cell is known as a proton exchange membrane (PEM) fuel cell. Individual fuel cells can be stacked together in series to form a fuel cell stack. The fuel cell stack is capable of supplying a quantity of electricity sufficient to provide power to a vehicle.

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus, are directed through a load to perform work before being sent to the cathode.

Proton exchange membrane fuel cells (PEMFC) are a popular fuel cell for vehicles. The PEMFC generally includes a solid polymer-electrolyte proton-conducting membrane, such as a perfluorosulfonic acid membrane, for example. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture, and the membrane define a membrane electrode assembly (MEA).

Several fuel cells are typically combined in a fuel cell stack to generate the desired power. For the automotive fuel cell stack mentioned above, the stack may include two hundred or more fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode reactant gas such as hydrogen that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material such as stainless steel or a conductive composite. The end plates conduct the electricity generated by the fuel cells out of the stack. The bipolar plates also include flow channels through which a cooling fluid flows.

While a fuel cell stack in a vehicle rejects less heat in total compared to an internal combustion engine due to its higher efficiency, the offbeat rejected into the coolant is higher as heat losses into the exhaust are lower compared to an internal combustion engine. Typical stack coolant temperatures are lower than internal combustion engine coolant temperatures, making it more difficult to reject the stack heat load to ambient within a given package space for all vehicle heat exchangers.

Additional heat needing to be rejected by the CRFM is produced in the electric drive unit of fuel cell vehicles. This heat rejection needs to be achieved without compromising the cooling performance in regard to the fuel cell stack.

The invention is not limited to the application set forth below but is applicable for use with other components that need to be cooled such as power electronics and electric motors, for example, a heat exchanger for power electronics could be mounted in the wheel house.

SUMMARY OF THE INVENTION

The present invention overcomes the fuel cell system cooling issues experienced by current systems. While the present invention discusses a PEMFC system, the embodiment disclosed herein can be used with any fuel cell arrangement.

In one embodiment, the present invention is directed to a thermal system for cooling a fuel cell stack, and a drive unit in a fuel cell vehicle. The system comprises a drive unit and a fuel cell stack. An oil cooling loop for the drive unit includes a three way valve, a liquid to liquid heat exchanger and a pump. The oil flows around the loop from the drive unit through the three way valve and the liquid to liquid heat exchanger to the pump where it is pumped into the drive unit. The liquid to liquid heat exchanger may be bypassed by repositioning the three way valve and allowing the oil to flow along an oil flow path from the drive unit through the pump into the drive unit. In the embodiment shown, the oil cooling loop does not include an air-liquid heat exchanger.

The coolant flow path for the fuel cell stack includes the same liquid to liquid heat exchanger, an air heat exchanger, a three way valve, and a pump. The coolant flows around the loop from the fuel cell stack through the liquid to liquid heat exchanger through the air heat exchanger to the pump where it is pumped into the fuel cell stack. The air heat exchanger may be bypassed by repositioning the three way valve and allowing the coolant to flow along the coolant path from the fuel cell stack through the liquid to liquid heat exchanger and is returned to the fuel cell stack through the pump.

BRIEF DESCRIPTION OF THE DRAWINGS

The above, as well as other advantages of the present invention, will become readily apparent to those skilled in the art from the following detailed description, when considered in the light of the accompanying drawings.

DETAILED DESCRIPTION OF EXEMPLARY EMBODIMENTS OF THE INVENTION

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
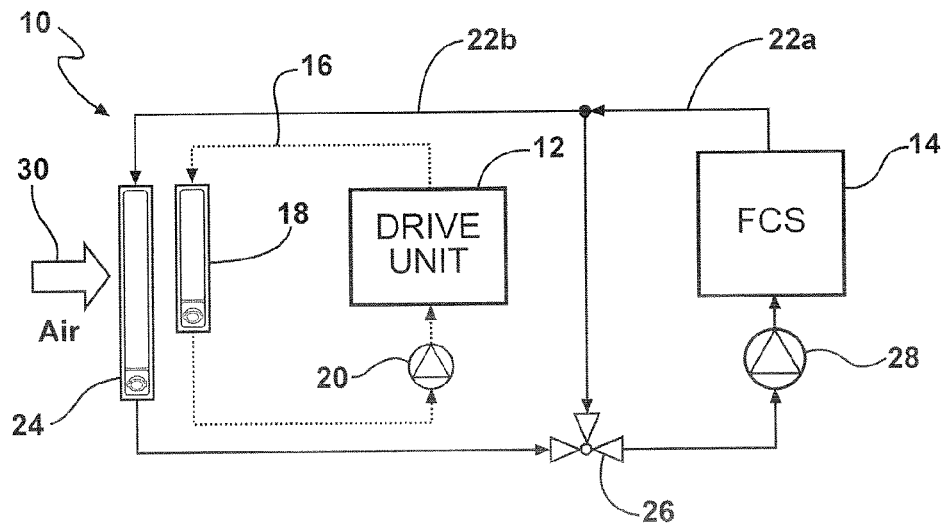
FIG. 1 illustrates a cooling system for a fuel cell stack and a drive unit for a fuel cell vehicle according to the prior art.

FIG. 1 illustrates a cooling system 10 for a fuel cell vehicle according to the prior art. The cooling system 10 includes a drive unit 12 and a fuel cell stack 14. An oil cooling loop 16 for the drive unit 12 includes a liquid to air heat exchanger 18 and a pump 20. As illustrated, the oil flows in a counterclockwise direction around the cooling loop 16 from the drive unit 12 through the heat exchanger 18 to the pump 20, where it is pumped back into the drive unit 12. The heat exchanger 18 may also be referred to as a radiator.

Coolant flow paths 22a, 22b for the fuel cell stack 14 include a liquid to air heat exchanger 24 (also referred to as a radiator), a three way valve 26 and a pump 28. As shown, the three way valve 26 allows the coolant to flow from the fuel cell stack 14 counterclockwise through the pump 28 where it is pumped into the fuel cell stack 14 along the coolant flow path 22a. Alternatively, if greater cooling is required, the coolant flows along the coolant flow path 22b. The coolant flows from the fuel cell stack 14 through the heat exchanger 24 and the pump 28, where it is pumped back into the fuel cell stack 14.

The oil cooling loop 16 for the drive unit 12 rejects heat to ambient through the heat exchanger 18. The heat exchanger 18 is aligned in the same airflow path 30 as the heat exchanger 24 in the coolant flow path 22b. The airflow path 30 is created by ram air or a fan (not shown).

Figure 2:
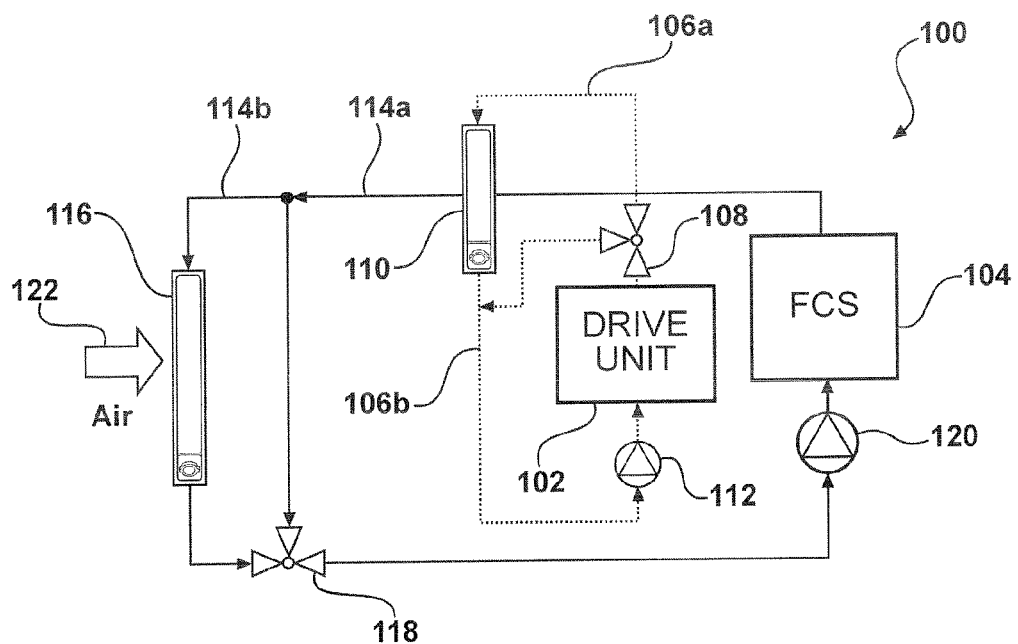
FIG. 2 illustrates a cooling system for a fuel cell stack and a drive unit for a fuel cell vehicle according to an embodiment of the invention.

FIG. 2 illustrates a cooling system 100 according to an embodiment of the invention. The cooling system 100 includes a drive unit 102 and a fuel cell stack 104. Oil cooling loops 106a, 106b for the drive unit 102 include a three way valve 108, a liquid to liquid heat exchanger 110 and a pump 112. As shown, the oil flows in a counterclockwise direction around the loop 106a from the drive unit 102 through the three way valve 108 and the heat exchanger 110 to the pump 112, where it is pumped into the drive unit 102.

Alternatively, the heat exchanger 110 may be bypassed by closing the three way valve 108 and allowing the oil to flow along the oil flow path 106b from the drive unit 102 through the pump 112 into the drive unit 102.

Cooling flow paths 114a, 114b for the fuel cell stack 104 include the liquid to liquid heat exchanger 110, which is also a part of the oil flow path 106a of the drive unit 102, a liquid to air heat exchanger 116 (radiator), a three way valve 118, and a pump 120. As illustrated, the three way valve 118 allows the coolant to flow from the fuel cell stack 104 counterclockwise through the heat exchanger 110 to the pump 120, where it is pumped into the fuel cell stack 104 along the cooling flow path 114a. Alternatively, if greater cooling is required, the coolant flows along the cooling flow path 114b from the fuel cell stack 104 through both the heat exchanger 110 and the heat exchanger 116 to the pump 120, where it is pumped into the fuel cell stack 104. Airflow 122 is created by ram air or a fan (not shown).

The cooling system 100 takes advantage of the fact that the oil temperature in the drive unit cooling loops 106a, 106b can be considerably higher than the coolant temperature in the fuel cell stack cooling loops 114a, 114b at high loads. The system 100 allows for a liquid to liquid heat exchange between the oil and the coolant.

Heat loads transferred from the drive unit cooling loops 106a, 106b to the stack coolant loops 114a, 114b lead to a higher coolant temperature and heat load at the heat exchanger 116. The higher heat load at the heat exchanger 116 is compensated for by a higher performance of the heat exchanger 116 due to the greater difference between a temperature of the coolant and a temperature of the ambient air. An advantage of the cooling system 100 is a reduction in an overall volume consumed by the cooling system 100. The ram air flow 122 restriction of the air heat exchanger 116 is reduced by deleting the oil to air heat exchanger, and therefore, greater air flow is permitted. This further increases the capability to reject heat to ambient with the radiator 116.

The system can be applied during different drive situations. If the drive unit 102 is warmer than the fuel cell stack 104, and both need to reject heat, the valve 108 is switched to enable flow through the heat exchanger 110. The drive unit heat adds heat to the cooling loop 114b, but also raises a temperature at an inlet of the heat exchanger 116.

If the drive unit 102 is colder than the coolant temperature at an outlet of the fuel cell stack 104, and the fuel cell stack 104 does not need to reject heat via the cooling loops 106a, 106b, the cooling loops 106a, 106b can be decoupled from the cooling loops 114a, 114b by switching the three-way valve 108 to cause the coil to bypass the heat exchanger 110. This is especially important during a stack warm-up after cold soak.

When the drive unit 102 is colder than the fuel cell stack 104 and the fuel cell stack 104 needs to reject additional heat, it is possible to transfer heat to the drive unit 102, thereby taking advantage of a high heat capacity thereof. The valve 108 is switched to enable flow of the oil through the drive unit heat exchanger 110. This increases the heat rejection of the cooling loop 114a without the need for additional fan power, at least for a certain time interval. This is an advantage during rather short vehicle acceleration modes where the buffering effect will help to avoid a temperature of the fuel cell stack 104 increasing above a desired setpoint.

If the drive unit 102 is colder than the coolant out temperature of the fuel cell stack 104 and the coolant temperature has to be reduced quickly, the heat capacity of the cooling loops 106a, 106b can be used to reduce temperature in a similar fashion. This helps to reduce the usage of fans, thereby minimizing noise levels and maximizing efficiency. This may be used for down transients/vehicle deceleration.

When the drive unit 102 is warmer than the fuel cell stack 104 and the fuel cell stack 104 requires heat, the cooling system 100 can be used to add heat to the cooling loops 114a, 114b. This is done by controlling the oil flowing through the heat exchanger 110 as required to increase the temperature of the coolant in the cooling loop 114a. This can occur when the fuel cell stack 104 is running at idle where convective/conductive heat losses of the fuel cell stack 104 lead to a situation where heat is needed by the fuel cell stack 104 to maintain a desired temperature. This minimizes the use of electrical heaters maximizes efficiency at idle/low power of the fuel cell stack 104.

The three-way valve 108 can be an inexpensive, digital valve as the temperature of the drive unit 102 does not need to be precisely controlled. Typically, any temperature below a maximum desired temperature is acceptable for the drive unit 102.

Since temperatures for the cooling loops 106a, 106b, 114a, 114b are typically already measured for other purposes (power limitation etc.) a model based approach based on characteristics of the heat exchanger 110 can be easily implemented in a controller used to control a position of the three way valve 108.

The airflow 122 is maximized as the overall pressure drop is minimized by deleting the heat exchanger 18 illustrated in FIG. 1. For the same reason, the required package space for the cooling system 100 is minimized. The heat exchanger 110 is typically smaller than the heat exchanger 18 and can be packaged more easily, as it does not need to be positioned in the airflow 122. Additionally the cooling loops 114a, 114b can take advantage of the thermal capacity of the drive unit 102 to maximize transient cooling performance.

The overall efficiency of the cooling system 100 is maximized in situations where the cooling loops 106a, 106b are substituted for the usage of electric coolant heaters and fans. Substitution of fan usage also minimizes vehicle noise emissions.

The main objective of the above-identified system is the ability to decouple the cooling loops if needed. The invention achieves this by a bypass valve on the oil side. Alternatively, the decoupling may also be achieved by a second bypass valve on stack coolant side or other means. Either decoupling method is acceptable dependent on the system's oil flows: where oil flows are lower than stack coolant flows or high volume flows through the bypass valve either require a complex/big valve design or drive a high additional pressure drop in the loop=>increased pump power consumption.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A cooling system for a fuel cell stack and a drive unit comprising:
    a stack cooling loop including a first coolant flow path with a fuel cell stack and a first heat exchanger, a second heat exchanger, and a first three way valve, the first three way valve selectively facilitating a thermal coupling of the first coolant flow path through the second heat exchanger, wherein said stack cooling loop is configured to increase at least one of air flow about the cooling system and the capability of the cooling system to reject heat to ambient air by directing air flow through the second heat exchanger only; and
    an oil cooling loop including a second coolant flow path with the first heat exchanger, a drive unit, and a second three way valve, the second three way valve selectively facilitating a thermal coupling of said oil cooling loop to said stack cooling loop through the first heat exchanger, wherein only the first heat exchanger is part of said first coolant flow path and said second coolant flow path.

2. The cooling system of claim 1, wherein the second heat exchanger of said stack cooling loop is an air heat exchanger.

3. The cooling system of claim 2, wherein said stack cooling loop includes a bypass for selectively bypassing said air heat exchanger.

4. The cooling system of claim 1, wherein said stack cooling loop further comprises a pump for causing a flow of a coolant through said stack cooling loop.

5. The cooling system of claim 4, wherein said second heat exchanger is thermally decoupled from said stack cooling loop by diverting a flow of coolant with the first three way valve.

6. The cooling system of claim 1, wherein said oil cooling loop includes a bypass for selectively bypassing the first heat exchanger.

7. The cooling system of claim 1, wherein the first heat exchanger is a liquid to liquid heat exchanger.

8. The cooling system of claim 1, wherein said oil cooling loop further comprises a pump for causing a flow of oil through said oil cooling loop.

9. The cooling system of claim 2, wherein said oil cooling loop is thermally decoupled from said stack cooling loop by diverting a flow of oil from the first heat exchanger with the second three way valve.

10. A cooling system for a fuel cell stack and a drive unit comprising:
    a stack cooling loop including a first coolant flow path with a fuel cell stack and a first heat exchanger that is a liquid to liquid heat exchanger, a second heat exchanger, and a first three way valve, the first three way valve selectively facilitating a thermal coupling of the first coolant flow path with the second heat exchanger, wherein said stack cooling loop is configured to increase at least one of air flow about the cooling system and the capability of the cooling system to reject heat to ambient air by directing air flow through the second heat exchanger only; and
    an oil cooling loop including a second coolant flow path with the liquid to liquid heat exchanger, a drive unit, and a second three way valve, the second three way valve selectively facilitating a thermal decoupling of said oil cooling loop from said stack cooling loop by diverting a flow of oil from the liquid to liquid heat exchanger, wherein only the liquid to liquid heat exchanger is part of the first coolant flow path and the second coolant flow path.

11. The cooling system of claim 10, wherein the second heat exchanger of said stack cooling loop is an air heat exchanger.

12. The cooling system of claim 11, wherein said stack cooling loop includes a bypass for selectively bypassing said air heat exchanger.

13. The cooling system of claim 10, wherein said oil cooling loop includes a bypass for selectively bypassing the liquid to liquid heat exchanger.

14. The cooling system of claim 10, wherein said stack cooling loop further comprises a pump for causing a flow of a coolant through said stack cooling loop.

15. The cooling system of claim 14, wherein the second heat exchanger is thermally decoupled from said stack cooling loop by diverting a flow of coolant with the first three way valve.

16. The cooling system of claim 10, wherein said oil cooling loop further comprises a pump for causing a flow of oil through said oil cooling loop.

17. The cooling system of claim 16, wherein said oil cooling loop is thermally decoupled from said stack cooling loop by diverting a flow of oil from the first heat exchanger with the second three way valve.

* * * * *